United States Patent
Aishima

(10) Patent No.: US 10,479,215 B2
(45) Date of Patent: Nov. 19, 2019

(54) FUEL CELL VEHICLE

(71) Applicant: TOYOTA JIDOSHA KABUSHIKI KAISHA, Toyota-shi, Aichi-ken (JP)

(72) Inventor: Tetsuji Aishima, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/880,894

(22) Filed: Jan. 26, 2018

(65) Prior Publication Data
US 2018/0257509 A1   Sep. 13, 2018

(30) Foreign Application Priority Data

Mar. 8, 2017   (JP) .................. 2017-043822

(51) Int. Cl.
| | |
|---|---|
| B60K 1/04 | (2019.01) |
| B60K 8/00 | (2006.01) |
| B60L 11/08 | (2006.01) |
| H01M 8/00 | (2016.01) |
| H01M 8/04 | (2016.01) |
| H01M 8/10 | (2016.01) |
| B60L 11/18 | (2006.01) |
| H01M 8/04082 | (2016.01) |

(Continued)

(52) U.S. Cl.
CPC .......... *B60L 11/1898* (2013.01); *B60K 15/07* (2013.01); *H01M 8/04014* (2013.01); *H01M 8/04201* (2013.01); *H01M 8/2465* (2013.01); *B60K 2015/03315* (2013.01); *B60K 2015/03414* (2013.01); *B60K 2015/0634* (2013.01); *H01M 2250/30* (2013.01)

(58) Field of Classification Search
CPC ........ B60L 58/30; B60L 58/33; B60L 3/0053; B60L 3/00

See application file for complete search history.

(56) References Cited

U.S. PATENT DOCUMENTS

2006/0222910 A1* 10/2006 Aoyagi .............. B60H 1/00392
429/432
2014/0367182 A1   12/2014 Yoshinaga et al.
(Continued)

FOREIGN PATENT DOCUMENTS

| JP | 2002373691 A | 12/2002 |
|---|---|---|
| JP | 2015231319 A | 12/2015 |

(Continued)

OTHER PUBLICATIONS

English translation of Notice of Reasons for Refusal, drafted Aug. 20, 2019, dated Aug. 27, 2019, in JP 2017-043822.

(Continued)

*Primary Examiner* — Ula C Ruddock
*Assistant Examiner* — Amanda Rosenbaum
(74) *Attorney, Agent, or Firm* — Dickinson Wright, PLLC

(57) ABSTRACT

A fuel cell vehicle comprising: a hydrogen tank which is mounted on the vehicle so as to have a center axis generally parallel to a front/rear direction of the vehicle; a high-voltage electric component which is positioned either forward or rearward of the hydrogen tank and which operates on high voltage; an aftercooler placed between the hydrogen tank and the high-voltage electric component to cool compressed air; and a fuel cell stack which is supplied with the cooled compressed air.

7 Claims, 8 Drawing Sheets

(51) Int. Cl.
H01M 8/04014 (2016.01)
H01M 8/2465 (2016.01)
B60K 15/07 (2006.01)
B60K 15/03 (2006.01)
B60K 15/063 (2006.01)

(56) References Cited

U.S. PATENT DOCUMENTS

2015/0027796 A1  1/2015  Naito et al.
2017/0096172 A1  4/2017  Nagaosa

FOREIGN PATENT DOCUMENTS

| JP | 2016137852 A | 8/2016 |
| WO | 2013111669 A1 | 8/2013 |
| WO | 2013118602 A1 | 8/2013 |

OTHER PUBLICATIONS

Tatsuya Sugawara et al., Clarity Fuel Cell, Development of Air Supply System for Clarity Fuel Cell, Honda R&D Technical Review, Honda R&D Co., Ltd., Japan, Oct. 2016, vol. 28, No. 2, pp. 52-58, ISSN: 2187-381 x.

* cited by examiner

FUEL CELL VEHICLE

CROSS REFERENCE TO RELATED APPLICATIONS

This application claims priority to Japanese Patent Application No. 2017-43822 filed on Mar. 8, 2017, the entire contents of which are incorporated by reference herein.

TECHNICAL FIELD

The present disclosure relates to protection of high-voltage electric components mounted on a fuel cell vehicle.

RELATED ART

A fuel cell vehicle disclosed in JP 2015-231319 A has a fuel cell stack mounted in a space positioned forward of a cabin and separated from the cabin by a dashboard. In this fuel cell vehicle, a hydrogen tank is mounted within a center tunnel.

SUMMARY

Technical Problem

Due to a collision accident or the like, there may occur a collision of the hydrogen tank with some of the other components mounted on a fuel cell vehicle. The other components include high-voltage electric components. The term, high-voltage electric components, refers to electric components that operate on high voltage. The high-voltage electric components are, preferably, protected more securely from collisions with the hydrogen tank than constituent components other than the high-voltage electric components.

As a countermeasure for protecting high-voltage electric components, it is conceivable to make the hydrogen tank and the high-voltage electric components largely distant from each other in their mounting position. However, this countermeasure would make it difficult to design the vehicle compact.

Another countermeasure may be to provide an exclusive protective member for protection of the high-voltage electric components. This countermeasure, however, would incur increases in cost.

The present disclosure, in view of the above-described circumstances, has an objective of implementing the protection of high-voltage electric components from collisions with the hydrogen tank by compact, low-cost means.

Solution to Problem

In one aspect of the present disclosure, there is provided a fuel cell vehicle including: a hydrogen tank which is mounted on the vehicle so as to have a center axis generally parallel to a front/rear direction of the vehicle; a high-voltage electric component which is positioned either forward or rearward of the hydrogen tank and which operates on high voltage; an aftercooler placed between the hydrogen tank and the high-voltage electric component to cool compressed air; and a fuel cell stack which is supplied with the cooled compressed air.

DESCRIPTION OF EMBODIMENTS

Figure 1:
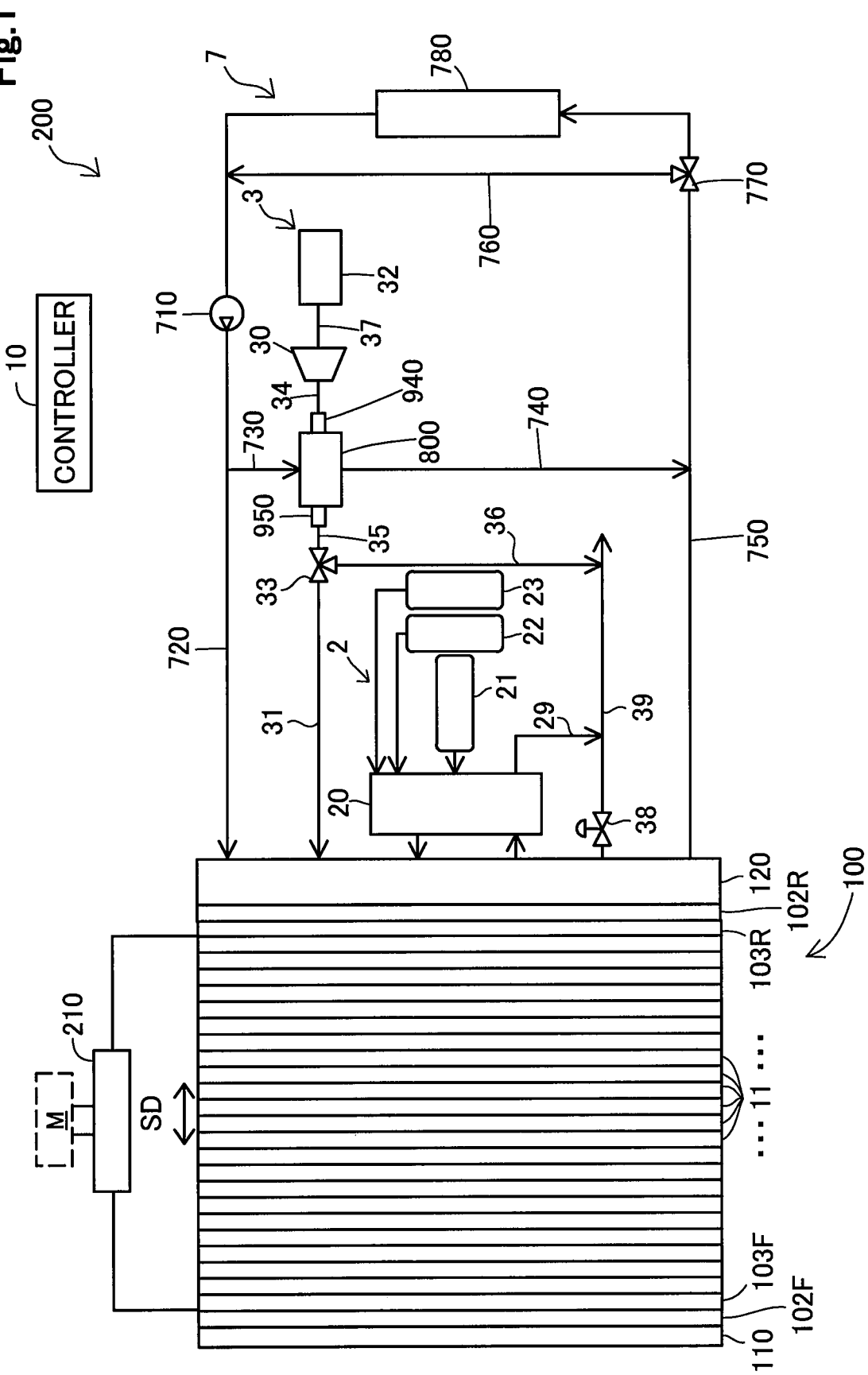
FIG. 1 is an outline configuration diagram of a fuel cell system.

FIG. 1 shows an outline configuration of a fuel cell system 200. The fuel cell system 200 includes a fuel gas system 2, an oxidizing gas system 3, a cooling water system 7, a controller 10, a fuel cell stack 100, and an electric circuit 210.

The fuel cell stack 100 includes a plurality of cells 11 stacked together along a stacking direction SD. The fuel cell stack 100 includes a pair of end plates 110, 120 at both end portions, respectively, in the stacking direction SD. Each cell 11 is a solid polymer type fuel cell. The cells 11 generate electric power through electrochemical reactions of fuel gas and oxidizing gas. In this embodiment, the fuel gas is hydrogen gas and the oxidizing gas is air.

Inside the fuel cell stack 100, manifolds (not shown) as flow paths for the fuel gas, the oxidizing gas and cooling water are formed along the stacking direction SD of the cells 11.

A pair of current collecting plates 103F, 103R in the fuel cell stack 100 are electrically connected to the electric circuit 210. An insulating plate 102F is placed between the current collecting plate 103F and the end plate 110. Likewise, an insulating plate 102R is placed between the current collecting plate 103R and the end plate 120. The electric circuit 210 is formed of an inverter, a converter and the like which are already known. The electric circuit 210, which is electrically connected to a motor M, transforms and supplies generated power of the fuel cell stack 100 to the motor M.

The fuel gas system 2 includes auxiliary machines 20, a hydrogen tank 21, a hydrogen tank 22, a hydrogen tank 23, and a fuel gas discharge path 29.

The hydrogen tanks 21, 22, 23, having high-pressure hydrogen stored therein, supplies hydrogen gas as a fuel gas to the auxiliary machines 20. The auxiliary machines 20 are composed of an injector, a hydrogen pump, a gas-liquid separator and the like which are already known. The auxiliary machines 20 supplies the fuel gas to the fuel cell stack 100 or discharges the fuel gas via the fuel gas discharge path 29.

The oxidizing gas system 3 includes an air compressor 30, an oxidizing gas supply path 31, an air cleaner 32, a three-way valve 33, an ejection flow path 34, an outlet flow path 35, a bypass 36, a suction flow path 37, a pressure regulating valve 38, a discharge flow path 39, an aftercooler 800, an inlet part 940, and an outlet part 950. The aftercooler 800 is also referred to as intercooler.

The air cleaner 32 collects foreign matters contained in air that passes through the air cleaner itself. The air compressor 30 compresses air sucked from the atmosphere via the air cleaner 32 and the suction flow path 37. The compressed air goes high in temperature. The air compressed by the air compressor 30 flows into the aftercooler 800 via the ejection flow path 34 and the inlet part 940. The compressed air having flowed into the aftercooler 800 is cooled by the aftercooler 800.

The compressed air cooled by the aftercooler 800 flows into the three-way valve 33 via the outlet part 950 and the outlet flow path 35. The compressed air having flowed into the three-way valve 33 flows into at least either one of the oxidizing gas supply path 31 and the bypass 36 depending on the degree of opening of the three-way valve 33.

The compressed air having flowed into the oxidizing gas supply path 31 flows into the fuel cell stack 100. The compressed air having flowed into the fuel cell stack 100 passes through within the fuel cell stack 100, flowing into the pressure regulating valve 38. The air regulated in pressure by the pressure regulating valve 38 is discharged into the atmosphere via the discharge flow path 39. The compressed air having flowed into the bypass 36 is discharged into the atmosphere via the discharge flow path 39.

The cooling water system 7 includes a water pump 710, a cooling water supply flow path 720, an aftercooler-dedicated supply flow path 730, an aftercooler-dedicated discharge flow path 740, a cooling water discharge flow path 750, a bypass 760, a three-way valve 770, and a radiator 780.

The water pump 710 circulates cooling water. Part of cooling water having flowed out from the water pump 710 flows into the fuel cell stack 100 via the cooling water supply flow path 720. The cooling water having flowed into the fuel cell stack 100 cools the fuel cell stack 100, then being discharged from the fuel cell stack 100. The cooling water discharged from the fuel cell stack 100 flows into the cooling water discharge flow path 750. The cooling water having flowed into the cooling water discharge flow path 750 flows into at least either one of the bypass 760 and the radiator 780 depending on the degree of opening of the three-way valve 770.

The cooling water having flowed into the radiator 780 is cooled by the radiator 780, then being discharged from the radiator 780. The cooling water discharged from the radiator 780 flows into the water pump 710. Cooling water having flowed into the bypass 760 flows into the water pump 710 without being cooled almost at all.

Out of the cooling water having flowed out from the water pump 710, cooling water that does not flow into the fuel cell stack 100 flows into the aftercooler 800 via the aftercooler-dedicated supply flow path 730. The cooling water having flowed into the aftercooler 800 cools compressed air passing through the aftercooler 800, and then flows into the cooling water discharge flow path 750 via the aftercooler-dedicated discharge flow path 740.

The various operations described above are controlled by the controller 10. The controller 10 is configured from one or more ECUs.

All of the air compressor 30, the water pump 710, a hydrogen pump included in the auxiliary machines 20, and the motor M are high-voltage electric components. The term, high-voltage electric components, refers to components or parts that operate on high voltage. The term, high voltage, refers to a voltage equal to or higher than a specified voltage value defined by regulations applicable to locations at which a later-described fuel cell vehicle 500 travels. The air compressor 30 in this embodiment operates on a voltage of about 650 V. The specified voltage value mentioned above is a value lower than 650 V.

The specified voltage value is higher than 12 V. Therefore, components that operate at 12 V are other than the high-voltage electric components. For example, a pressure sensor 827 and a temperature sensor 829, which will be described later, operate at 12 V and therefore other than the high-voltage electric components.

Figure 2:
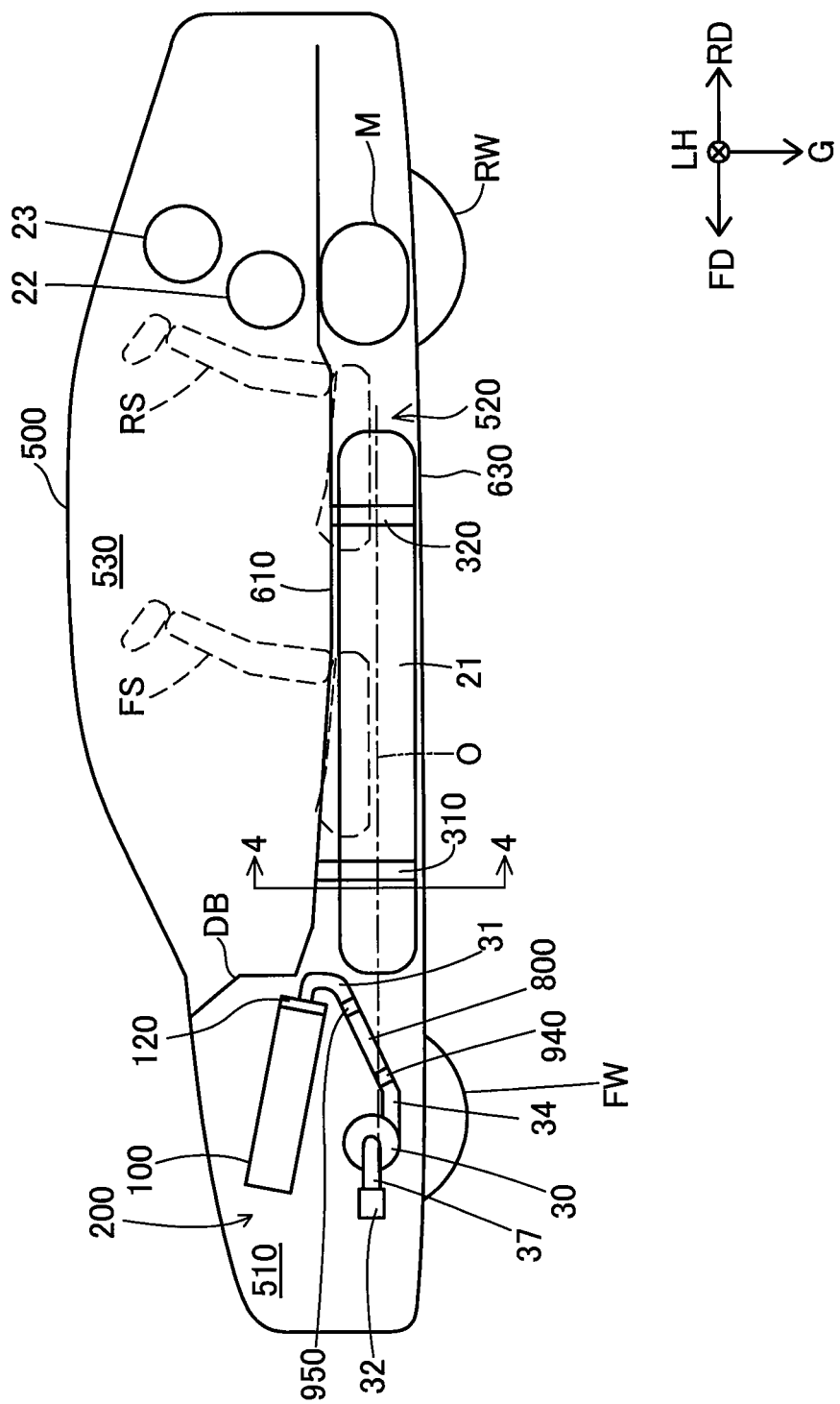
FIG. 2 is a side view showing an outline configuration of a fuel cell vehicle.
Figure 3:
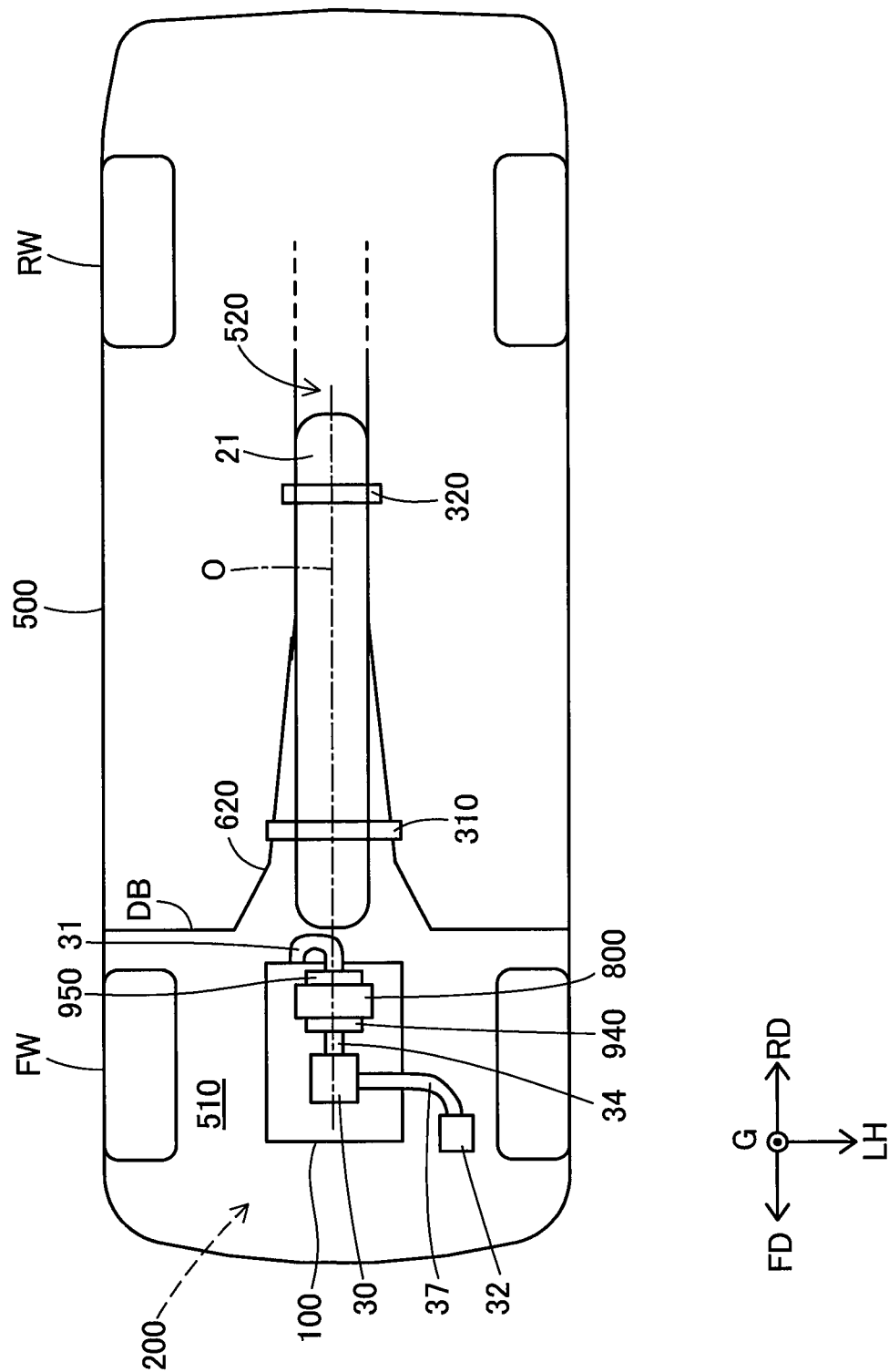
FIG. 3 is a bottom view showing an outline configuration of the fuel cell vehicle.

FIG. 2 is a side view showing an outline configuration of a fuel cell vehicle 500. FIG. 3 shows an outline configuration of the fuel cell vehicle 500 as in a bottom view. In FIGS. 2 and 3, part of the body or the like is omitted in depiction as appropriate.

The fuel cell vehicle 500 has the above-described fuel cell system 200 and motor M mounted thereon. Rear wheels RW are driven with a torque of the motor M. In FIGS. 2 and 3, constituent elements of the fuel cell system 200 shown in FIG. 1 are partly omitted in depiction.

In this embodiment, forward direction FD and rearward direction RD will be referred to generically as front/rear direction. In the fuel cell vehicle 500 are formed a front room 510, a center tunnel 520, and a cabin 530.

The front room 510 is formed as a space which is located on the forward direction FD side in the fuel cell vehicle 500 and which includes an area interposed between a pair of front wheels FW. As shown in FIGS. 2 and 3, the front room 510 accommodates therein the air compressor 30, the oxidizing gas supply path 31, the air cleaner 32, the ejection flow path 34, the aftercooler 800, the inlet part 940, and the outlet part 950.

As shown in FIGS. 2 and 3, the air compressor 30 and the aftercooler 800 are placed directly under the fuel cell stack 100.

The center tunnel 520 is located on the rearward direction RD side of the front room 510 and under the floor of the cabin 530. A border between the front room 510 and the center tunnel 520 is not definitely determinable, and the front room 510 and the center tunnel 520 are spatially contiguous to each other.

The cabin 530 is located on the rearward direction RD side of the front room 510 and on the upper side of the center tunnel 520. Front seat FS and rear seat RS are housed in the cabin 530. The front room 510 and the cabin 530 are partitioned from each other by a dashboard DB. The center tunnel 520 and the cabin 530 are partitioned from each other by a floor panel 610.

As shown in FIG. 2, the fuel cell stack 100 is placed so as to be inclined downward toward the rearward direction RD in the front/rear direction. In other words, the fuel cell stack 100 is placed with such an inclination in the front/rear direction as to be positioned increasingly downward toward the rearward direction RD.

The oxidizing gas supply path 31 is connected to the end plate 120. More specifically, the oxidizing gas supply path 31 is connected to an opening provided in the end plate 120. The term of opening refers to an opening of the above-mentioned manifold.

In a posture in which the fuel cell stack 100 is mounted on the fuel cell vehicle 500, the end plate 120 is positioned on the most rearward direction RD side out of constituent elements of the fuel cell stack 100. Accordingly, it follows that the oxidizing gas supply path 31 is connected to the rear face of the fuel cell stack 100. That is, the oxidizing gas supply path 31 is flow path piping that connects together the rear face of the fuel cell stack 100 and the outlet part 950 serving as an outlet flow path of the air compressor 30.

As already described, the air compressor 30 is placed directly under the fuel cell stack 100. Therefore, roughly speaking, compressed air from the air compressor 30 toward the fuel cell stack 100, after having flowed generally toward the rearward direction RD, flows vertically upward, and thereafter flows generally toward the forward direction FD.

The aftercooler 800 forms a flow path directed generally toward the rearward direction RD as described above. The oxidizing gas supply path 31 forms a flow path directed vertically upward as described above as well as a flow path directed generally toward the forward direction FD. The oxidizing gas supply path 31 is made shorter in flow path length in order to supply compressed air, which has flowed out from the aftercooler 800 placed directly under the fuel cell stack 100, through the rear face of the fuel cell stack 100.

The hydrogen tanks 21, 22, 23 each have a generally cylindrical-shaped external shape. The hydrogen tank 22 and the hydrogen tank 23 are housed so as to have center axes generally parallel to a widthwise direction LH. The hydrogen tank 22 and the hydrogen tank 23 are positioned on the rearward direction RD side of the rear seat RS. In addition, the hydrogen tank 22 and the hydrogen tank 23 are not shown in FIG. 3.

As shown in FIGS. 2 and 3, the hydrogen tank 21 is housed so as to have a center axis O generally parallel to the front/rear direction. The center tunnel 520 houses therein the hydrogen tank 21. The center tunnel 520 is formed along the front/rear direction in a generally center of the widthwise direction LH. Ceiling part of the center tunnel 520 and floor part of the cabin 530 are formed by the floor panel 610.

Figure 4:
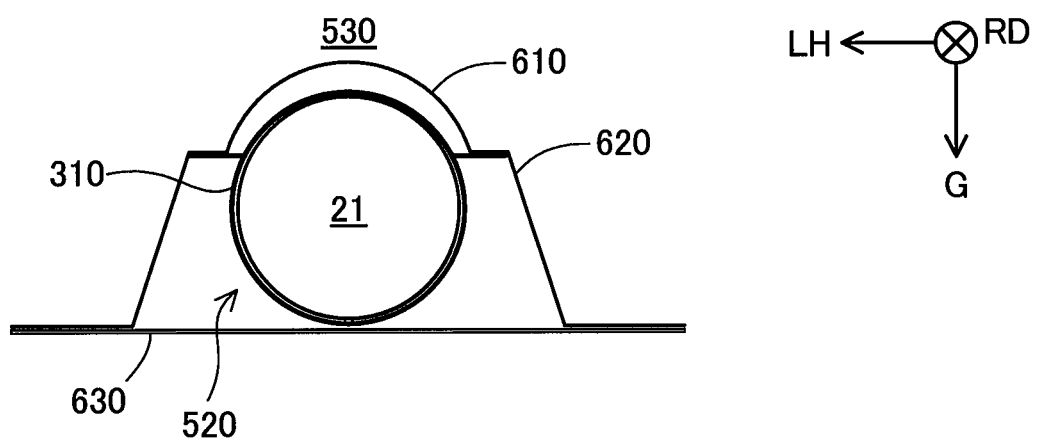
FIG. 4 is a sectional view taken along the line 4-4.

FIG. 4 is a sectional view showing a 4-4 cross section as indicated in FIG. 2. The center tunnel 520 is similar in shape to a center tunnel that houses therein a propeller shaft in known engine cars. The propeller shaft is also referred to as drive shaft. The center tunnel 520 is formed of the vertically upper floor panel 610, a side wall portion 620, and a lower cover 630. Portion of the floor of the cabin 530 corresponding to the center tunnel 520 is swollen vertically upward in comparison to other portions.

The hydrogen tank 21 is mounted on the side wall portion 620 by a first mounting member 310 and a second mounting member 320. Each of the first mounting member 310 and the second mounting member 320 includes a band portion and a mounting portion. The band portion surrounds the hydrogen tank 21 in its outer circumferential direction. The mounting portion allows the band portion to be mounted on the side wall portion 620.

Figure 5:
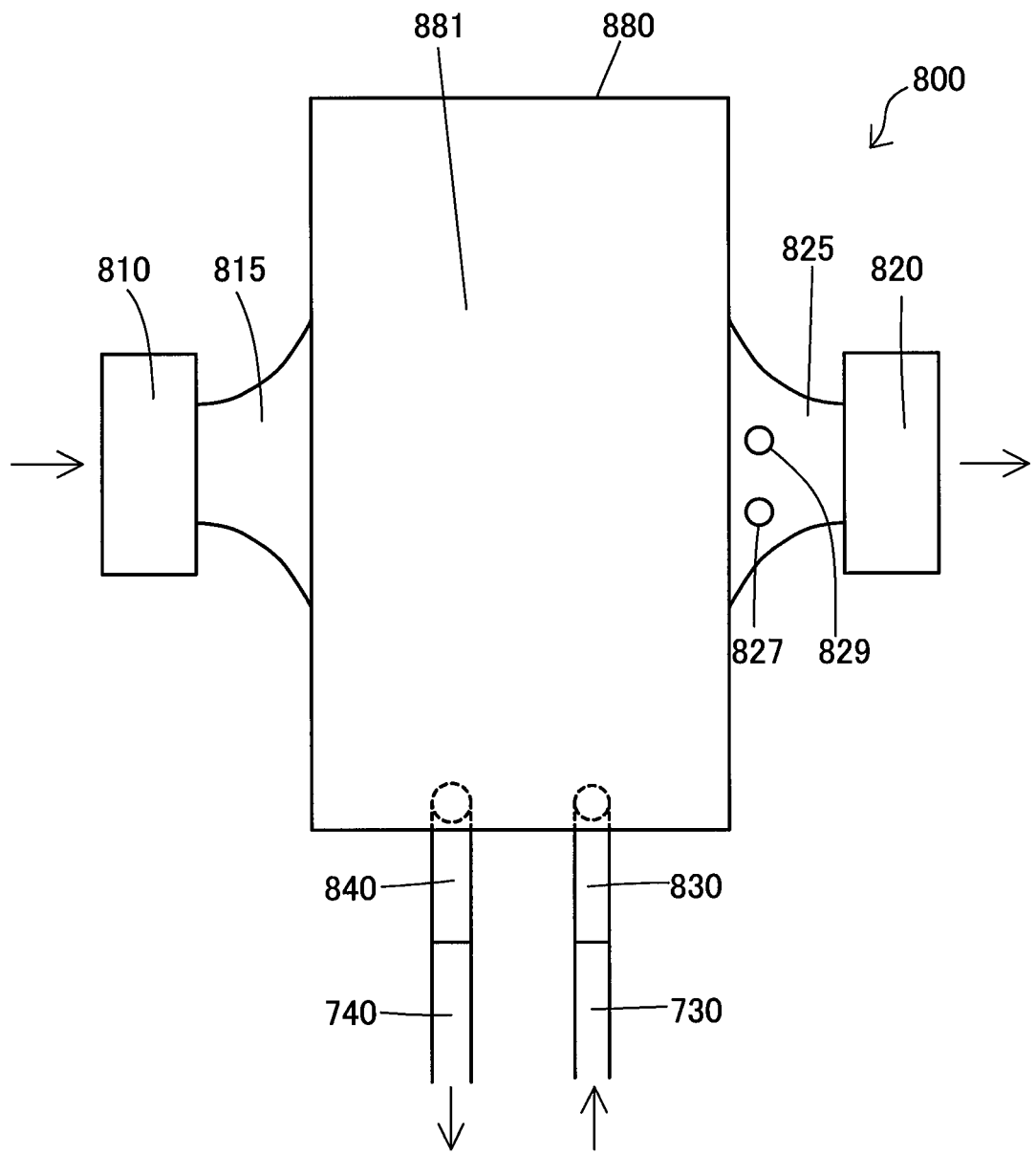
FIG. 5 is a bottom view of an aftercooler.

FIG. 5 is a bottom view of the aftercooler 800. The aftercooler 800 includes an inlet flange 810, an inlet connecting part 815, an outlet flange 820, an outlet connecting part 825, a pressure sensor 827, a temperature sensor 829, a cooling water inlet flow path 830, a cooling water outlet flow path 840, and a main body 880.

The inlet flange 810 is connected to the inlet part 940. The outlet flange 820 is connected to the outlet part 950. Compressed air flows in through the inlet flange 810 and flows into the main body 880 via the inlet connecting part 815.

Meanwhile, the cooling water inlet flow path 830 is connected to the aftercooler-dedicated supply flow path 730. The cooling water outlet flow path 840 is connected to the aftercooler-dedicated discharge flow path 740. Cooling water discharged from the water pump 710 flows into the main body 880 via the aftercooler-dedicated supply flow path 730. The cooling water having flowed into the main body 880 cools compressed air that has flowed into the main body 880. The cooling water having cooled the compressed air flows into the aftercooler-dedicated discharge flow path 740 via the cooling water outlet flow path 840.

The compressed air cooled in the main body 880 flows into the outlet part 950 via the outlet connecting part 825 and the outlet flange 820.

The pressure sensor 827 is attached to the outlet connecting part 825. The pressure sensor 827 measures pressure of after-cooling compressed air. The temperature sensor 829 is attached to the outlet connecting part 825. The temperature sensor 829 measures temperature of after-cooling compressed air.

A bottom face of the main body 880 is referred to as bottom face 881. FIG. 5 shows the bottom face 881 as the main body 880. It is noted that the cooling water inlet flow path 830 and the cooling water outlet flow path 840 are connected to the front face of the main body 880.

Figure 6:
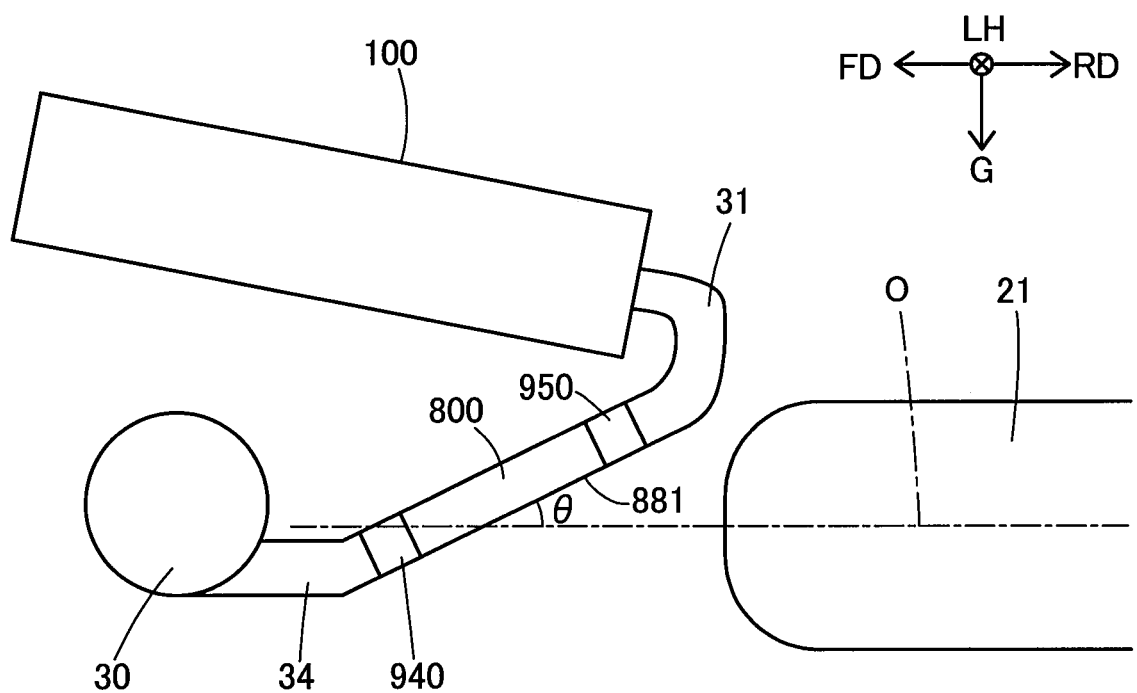
FIG. 6 is an enlarged view of a neighborhood of the aftercooler.

FIG. 6 is an enlarged view of a neighborhood of the aftercooler 800. The aftercooler 800 is mounted in an inclined posture. More specifically, the aftercooler 800 is mounted in such a posture that the outlet part 950 is positioned upward of the inlet part 940. For this reason, the bottom face 881 intersects the front/rear direction. An angle of the intersection, as shown in FIG. 6, is smaller than the right angle. Further, the bottom face 881, as shown in FIGS. 3 and 6, intersects the center axis O. An angle formed by the bottom face 881 and the center axis O is an angle θ. The angle θ is equal to an angle formed by the bottom face 881 and the front/rear direction.

Figure 7:
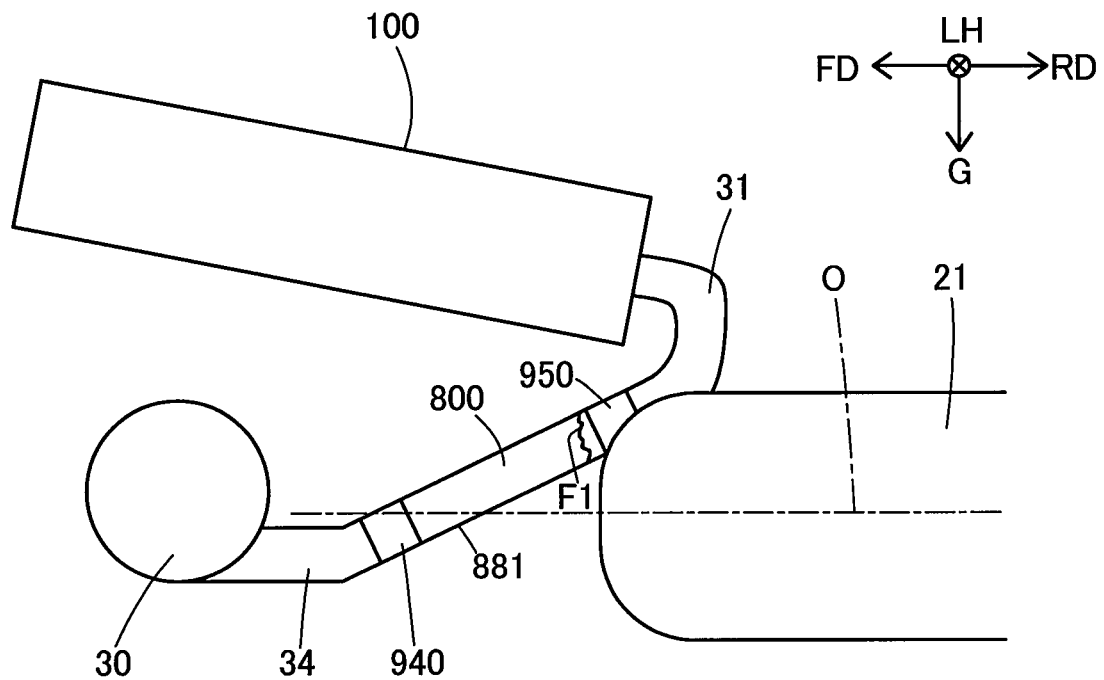
FIG. 7 is a view showing an aspect in which there has occurred a collision between a hydrogen tank and the aftercooler.

FIG. 7 shows an aspect in which there has occurred a collision between the hydrogen tank 21 and the aftercooler 800. This collision is caused by a collision accident of the fuel cell vehicle 500 or the like. This collision makes at least one of the hydrogen tank 21 and the air compressor 30 to be moved, so that the hydrogen tank 21 and the air compressor 30 come nearer to each other.

The collision may cause the aftercooler 800 to be ruptured. When a rupture occurs, the rupture may often occur first to the outlet connecting part 825. The reason of this is that the outlet connecting part 825 is positioned near the hydrogen tank 21 so as to receive force, in many cases, immediately after the collision, and that the outlet connecting part 825 includes a site of smaller cross-sectional area so as to have stress concentrated at the site. FIG. 7 shows a ruptured surface of the outlet connecting part 825 as ruptured surface F1.

Figure 8:
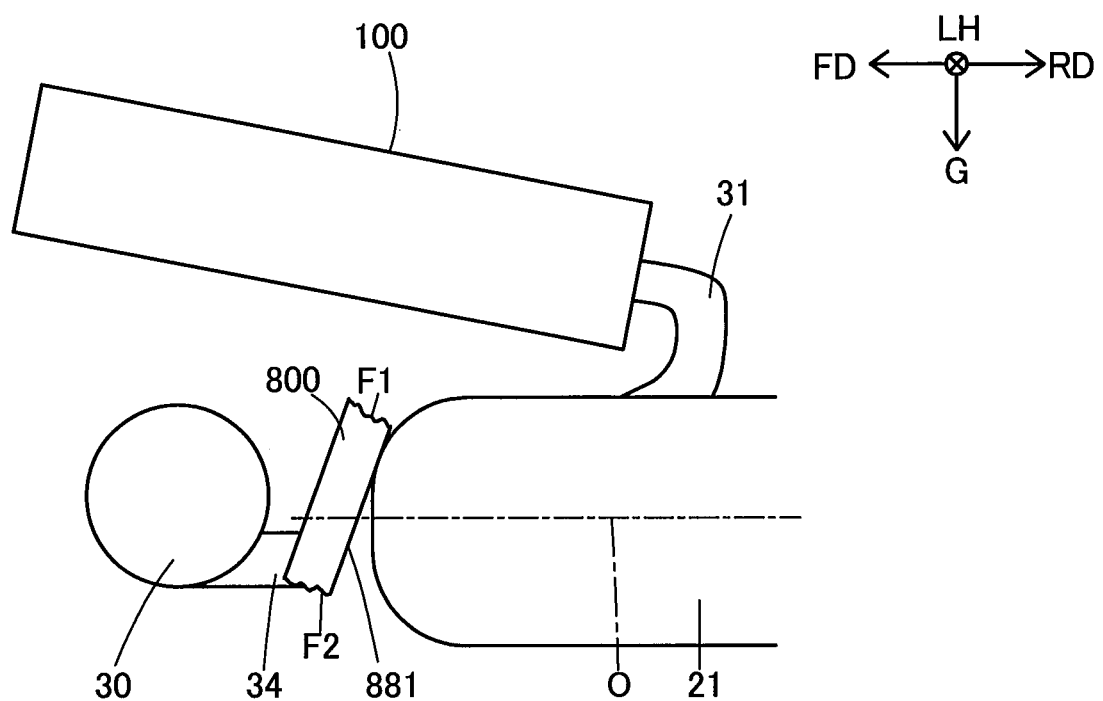
FIG. 8 is a view showing an aspect in which the ruptured aftercooler has been moved.

FIG. 8 shows an aspect in which the ruptured aftercooler 800 has moved. When the hydrogen tank 21 and the air compressor 30 come nearer to each other after occurrence of a rupture in the outlet connecting part 825, the aftercooler 800 is rotated. This rotation is about the widthwise direction LH. The rotation is caused by the inclination of the bottom face 881.

As the rotation angle becomes larger, the inlet connecting part 815 ruptures. This is because the inlet connecting part 815 includes a site of smaller cross-sectional area, as in the outlet connecting part 825. FIG. 8 shows a ruptured surface of the inlet connecting part 815 as ruptured surface F2.

Force that makes the hydrogen tank 21 and the air compressor 30 nearer to each other is damped by the rupture of the outlet connecting part 825 and the inlet connecting part 815 as well as the rotation of the aftercooler 800. As a result, the air compressor 30 is protected.

The present disclosure is not limited to the above-described embodiments, examples and modifications in the Specification and may be implemented in various configurations unless those configurations depart from the gist of the disclosure. For example, technical features in the embodiments, examples and modifications corresponding to technical features in the individual aspects described in the section of Summary may be replaced or combined with one another, as required, in order to solve part or entirety of the above-described problems or to achieve part or entirety of the above-described advantageous effects. Moreover, those technical features may be deleted, as required, unless herein otherwise described as indispensable, examples of which are shown below.

The high-voltage electric components to be protected by the aftercooler 800 may be other than the air compressor 30. For example, the high-voltage electric component may be any one of the water pump 710, the hydrogen pump, and the motor M. Given that the fuel cell vehicle 500 is equipped with an air conditioning device, the high-voltage electric component to be protected by the aftercooler 800 may be a compressor that compresses the refrigerant for air conditioning. Also, whether or not the voltage to be used for the operation is a high voltage may be determined arbitrarily without depending on regulations.

At least either one of the fuel cell stack and the high-voltage electric components to be protected may be placed rearward of the rear seat RS. For example, with an aim of protecting the motor M, the motor M may be placed in the front room, or the aftercooler 800 may be placed rearward of the rear seat RS.

The air compressor 30 may be placed upward of the fuel cell stack 100.

The aftercooler 800 may be mounted in a non-inclined posture. That is, the aftercooler 800 may be mounted so that the bottom face 881 becomes horizontal.

The space in which the hydrogen tank 21 is mounted does not necessarily need to be formed as the center tunnel 520. For example, it is also allowable that the floor of the cabin 530 is formed flat while the hydrogen tank 21 is mounted so as to be suspended under the floor.

The aftercooler 800 may exclude at least either one of the pressure sensor 827 and the temperature sensor 829.

In one aspect of the present disclosure, there is provided a fuel cell vehicle including: a hydrogen tank which is mounted on the vehicle so as to have a center axis generally parallel to a front/rear direction of the vehicle; a high-voltage electric component which is positioned either forward or rearward of the hydrogen tank and which operates on high voltage; an aftercooler placed between the hydrogen tank and the high-voltage electric component to cool compressed air; and a fuel cell stack which is supplied with the cooled compressed air. According to this aspect, protection of the high-voltage electric component from collisions with the hydrogen tank can be implemented by compact, low-cost means. Since the aftercooler functions as a protective member for protecting the high-voltage electric component from collisions with the hydrogen tank, it becomes no longer necessary to keep the hydrogen tank and the high-voltage electric component largely distant from each other in mounting position. Accordingly, it becomes feasible to design the fuel cell vehicle compact. Moreover, since the aftercooler is not an exclusive member for protecting the high-voltage electric component, an increase in cost is avoidable.

In the foregoing aspect, the fuel cell vehicle further may include a front room formed forward of a cabin, wherein the high-voltage electric component may be housed in the front room, and the hydrogen tank may be positioned rearward of the high-voltage electric component. According to this aspect, in the case where the high-voltage electric component is housed in the front room, the high-voltage electric component can be protected.

In the foregoing aspect, the high-voltage electric component may be an air compressor for feeding compressed air into the aftercooler, and the fuel cell stack may be housed in the front room, where the fuel cell vehicle may further include an oxidizing gas supply path which is connected to a rear face of the fuel cell stack and which allows the cooled compressed air to flow therethrough. According to this aspect, the oxidizing gas supply path can be shortened in length in the flow direction. Since the aftercooler is positioned rearward of the air compressor, it is rational that piping which allows compressed air having flowed out from the aftercooler to flow therethrough is positioned so as to extend rearward from the aftercooler. Further, since the fuel cell stack is housed in the front room, the piping extending rearward from the aftercooler is directed rearward of the rear face of the fuel cell stack. Therefore, the oxidizing gas supply path can be shortened by connecting the oxidizing gas supply path to the rear face of the fuel cell stack.

In the foregoing aspect, the air compressor may be placed downward of the fuel cell stack. According to this aspect, since the hydrogen tank can be mounted at a rather lower position, the resulting placement of the hydrogen tank becomes suited for its mounting along the front/rear direction.

In the foregoing aspect, the high-voltage electric component may be an air compressor for feeding compressed air into the aftercooler. According to this aspect, the air compressor can be protected.

In the foregoing aspect, the aftercooler may be mounted in such an inclined posture that its bottom face intersects the front/rear direction. According to this aspect, an even more effective protection of the high-voltage electric component can be achieved. Since the aftercooler is mounted in an inclined posture, a collision between the aftercooler and the hydrogen tank causes force in a rotational direction for the aftercooler. By this rotation, an impact due to the collision of the aftercooler and the hydrogen tank is relaxed, allowing the above-described effects to be obtained.

In the foregoing aspect, the fuel cell vehicle may further include a center tunnel which is an under-floor space formed by swelling of a floor of the cabin, wherein the hydrogen tank may be placed within the center tunnel. According to this aspect, the fuel cell vehicle can be designed compact.

The present disclosure may also be implemented in various modes other than the above-described aspects. For example, the disclosure may be implemented in modes such as a fuel cell vehicle manufacturing method.

What is claimed is:

1. A fuel cell vehicle comprising:
    a hydrogen tank which is mounted on the vehicle so as to have a center axis generally substantially parallel to a front/rear direction of the vehicle;
    a high-voltage electric component which is positioned either forward or rearward of the hydrogen tank and which operates on high voltage;
    an aftercooler placed between the hydrogen tank and the high-voltage electric component on a common plane, wherein the aftercooler, the hydrogen tank and the high-voltage electric component are in the common plane, and the common plane is substantially parallel to the front/rear direction of the vehicle, wherein the high-voltage electric component is adapted to cool compressed air; and
    a fuel cell stack which is supplied with the cooled compressed air.

2. The fuel cell vehicle in accordance with claim 1, further comprising
    a front room formed forward of a cabin, wherein
    the high-voltage electric component is housed in the front room, and
    the hydrogen tank is positioned rearward of the high-voltage electric component.

3. The fuel cell vehicle in accordance with claim 2, wherein
the high-voltage electric component is an air compressor for feeding compressed air into the aftercooler, and
the fuel cell stack is housed in the front room,
the fuel cell vehicle further comprising an oxidizing gas supply path which is connected to a rear face of the fuel cell stack and which allows the cooled compressed air to flow therethrough.

4. The fuel cell vehicle in accordance with claim 3, wherein
the air compressor is placed downward of the fuel cell stack.

5. The fuel cell vehicle in accordance with claim 1, wherein
the high-voltage electric component is an air compressor for feeding compressed air into the aftercooler.

6. The fuel cell vehicle in accordance with claim 1, wherein
the aftercooler is mounted in such an inclined posture that its bottom face intersects the front/rear direction.

7. The fuel cell vehicle in accordance with claim 1, further comprising
a center tunnel which is an under-floor space formed by swelling of a floor of a cabin of the fuel cell vehicle, wherein
the hydrogen tank is placed within the center tunnel.

* * * * *